Nov. 13, 1923.
R. F. BOSSINI
1,473,898
COFFEE MAKING MACHINE
Filed Oct. 11, 1920
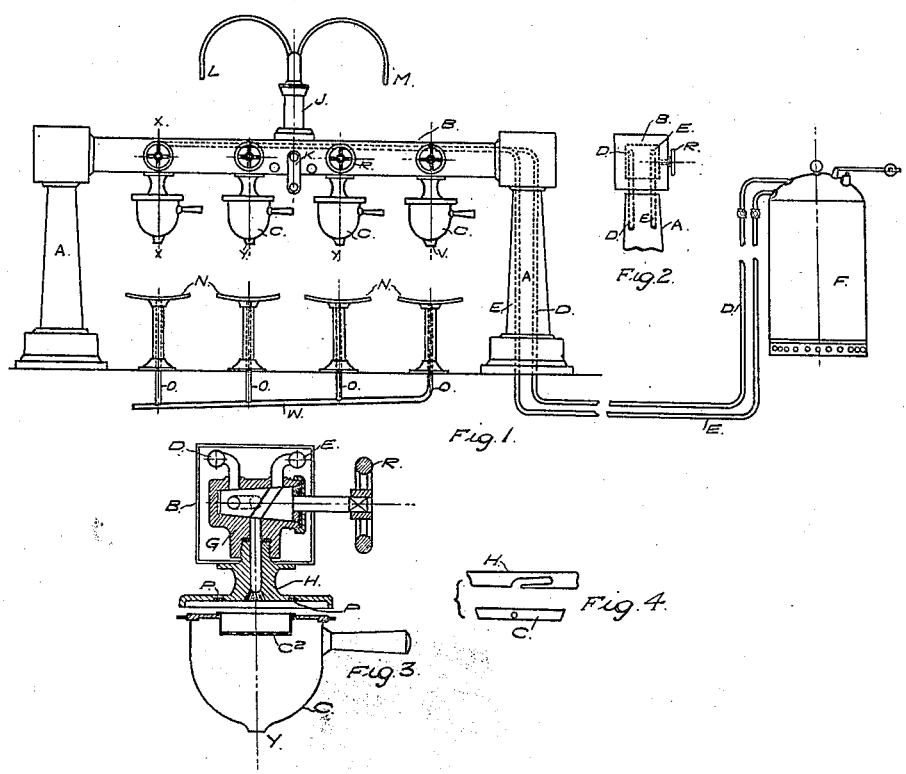
Inventor-
Raoul Felice Bossini,
By- B. Singer, Atty Patented Nov. 13, 1923.

1,473,898

UNITED STATES PATENT OFFICE.

RAOUL FELICE BOSSINI, OF LONDON, ENGLAND.

COFFEE-MAKING MACHINE.

Application filed October 11, 1920. Serial No. 416,138.

*To all whom it may concern:*

Be it known that I, RAOUL FELICE BOSSINI, of 26 Gosfield Street, Great Portland Street, London, W. 1, England, engineer, have invented certain new and useful Improvements in and Connected with Coffee-Making Machines, of which the following is a specification.

My invention relates to improvements in and connected with machines for making coffee, tea, and such like.

Coffee being a drink which loses its aromatic qualities soon after it is prepared, the object of my invention is to provide a simple, cheap, efficient and easily manipulated machine in which it is possible to serve to each customer a cup of coffee made on the spot and in a few seconds only.

According to my invention, the machine consists of two distinct parts, one being the part of the apparatus where the infusion takes place, and the other a boiler supplying boiling water and steam under pressure both of which are connected through suitable pipes and provided with suitable taps and cocks.

This disposition has been studied with a view of separating the apparatus itself from the boiler, and by so doing to render the installation less hampering and more adaptable on a counter.

Two columns are provided which support a bridge-piece holding a series of infusers and the connecting pipes from the boiler which run up through one of the columns and inside the bridge-piece. Each infuser represents in itself a complete apparatus and is operated for the admission of boiling water or steam by a suitable handle the number of infusers being limited only by the output of the apparatus required.

Each infuser is connected to the boiler through the medium of a two-way cock or two-way valve, one connection of the cock being connected to the steam space of the boiler and the other to the water space so that an alternate supply of steam or water may be passed through the infuser as and when required.

A longitudinal hole is provided on the arc of the coffee cup stands which are immediately underneath the infusers to run off the possible waste from the infusers. This hole is connected with an outlet tube through connections under the table of the apparatus.

The infuser, which is of cup or bowl-shape formation is provided with a loose container or sieve which serves as a receptacle for holding the coffee, tea or the like. The under side of the infuser terminates in a contracted opening. The infuser is attached to a holder by means of a bayonet socket joint or interrupted thread and is provided with a suitable handle and when so attached makes a steam-tight joint by means of a packing so that the steam or water passes from the two-way valve direct through the material in the containers and out through the opening at the bottom of the infusers into a cup or other receptacle placed underneath to receive same.

It is to be understood that the machine may have any number of infusers and the bridge piece may be of somewhat different construction.

In order that my invention may be properly understood and readily carried into effect, I have hereunto appended one sheet of drawings, of which—

Figure 1 is a front elevation of the whole apparatus and boiler.

Figure 2 is a part end view of Figure 1.

Figure 3 is a section through the line X—X, Figure 1.

Figure 4 shows the means of fixing the holder to the infuser.

Referring to the drawings, A designates the two columns and B is the bridge-piece supported by the columns A, while C are the infusers and Q are the handles for removing same, the said infusers being operated for the admission of boiling water or steam by the handle R. D and E are the two connecting pipes, one end of each of which is connected with the boiler F, and are led up through the column A and inside the bridge-piece B. G is the double connecting tap by which either steam or water can be discharged and P is the packing ring soldered to the holder H, and $C^2$ is the sieve. By the bayonet-joint attachment, Figure 4, the filter-sieve $C^2$ is clamped on the circular packing ring P thus forming a perfectly tight joint between the infuser C and the holder H. J is the device fixed to the upper side of the bridge-piece B and connected to pipes D and E by the double connecting tap K in order to supply boiling water and vapor through the pipes L and M at will. N are the cup stands for the coffee and have a longitudinal hole O for the discharge of any possible waste from the infuser. These holes O communicate with the outlet tube or pasage U under the table from which any waste is collected.

In using the apparatus, the coffee, tea or the like is first placed in one of the loose containers or sieves $C^2$ which is then placed in its position in the bowl C and the latter is placed into position in the holder and locked there by means of a bayonet socket or interrupted thread. Steam is then passed through the material in the container condensing therein and extracting the greater part of the essence, after which water is applied to take up and carry through the opening Y most of the essence until sufficient liquid has passed into a cup on stand N when the coffee, tea or the like is ready to be served. The waste coffee, tea or the like, is collected by the cup stands and discharged through the connections as already described.

I claim:—

In coffee making apparatus, a frame, a valve body supported by the frame and having steam and hot water ducts, and a common discharge duct, a boiler having steam and water connections with the respective ducts, a holder through which said common discharge duct discharges, a casing detachably connected to the holder and having a discharge opening, and a filter detachably mounted on said casing, and a valve element in said valve body arranged to put either the steam or hot water duct at will in communication with the common discharge duct and thereby cause either steam or hot water to be supplied to the filter and casing as required.

In testimony whereof I affix my signature in presence of two witnesses.

RAOUL FELICE BOSSINI.

Witnesses:
 JOHN LIDDLE,
 JOHN TRAIN LIDDLE.